(12) United States Patent
Bacon et al.

(10) Patent No.: US 11,856,289 B1
(45) Date of Patent: Dec. 26, 2023

(54) PORTABLE MEDIA CAPTURE DEVICE (71) Applicant: Yes Yes Media Limited, London (GB)

(72) Inventors: Richard Bacon, Los Angeles, CA (US);
Reed Seerman, Los Angeles, CA (US);
Geoffrey Abbott, Los Angeles, CA (US)

(73) Assignee: Yes Yes Media Limited, London (GB)

( * ) Notice: Subject to any disclaimer, the term of this patent is extended or adjusted under 35 U.S.C. 154(b) by 0 days.

(21) Appl. No.: 18/333,419

(22) Filed: Jun. 12, 2023

(51) Int. Cl.
*H04N 23/661* (2023.01)
*G06F 3/14* (2006.01)
*H04N 23/51* (2023.01)
*H04W 76/10* (2018.01)

(52) U.S. Cl.
CPC ......... *H04N 23/661* (2023.01); *G06F 3/1454* (2013.01); *H04N 23/51* (2023.01); *H04W 76/10* (2018.02)

(58) Field of Classification Search
CPC ..... H04N 23/661; H04N 23/51; H04W 76/10; G06F 3/1454
See application file for complete search history.

(56) References Cited

U.S. PATENT DOCUMENTS

| 9,037,128 | B2* | 5/2015 | Yang | H04N 23/51 |
| | | | | 455/552.1 |
| 10,540,073 | B2* | 1/2020 | Park | G06F 3/0488 |
| 11,188,298 | B2* | 11/2021 | Lee | G06F 3/0482 |
| 2014/0063066 | A1* | 3/2014 | Choi | G09G 5/37 |
| | | | | 345/634 |
| 2014/0300809 | A1* | 10/2014 | Oliveira | H04N 23/667 |
| | | | | 348/376 |
| 2016/0301849 | A1* | 10/2016 | E | H04N 23/661 |
| 2018/0004477 | A1* | 1/2018 | Jang | G06F 3/1423 |
| 2018/0152550 | A1* | 5/2018 | Dharmatilleke | H04N 23/55 |
| 2018/0338027 | A1* | 11/2018 | Sung | H01M 50/296 |
| 2019/0037612 | A1* | 1/2019 | Lin | H04W 76/10 |
| 2019/0116252 | A1* | 4/2019 | Hoellwarth | G06F 3/0362 |
| 2020/0036892 | A1* | 1/2020 | Araumi | H04N 5/45 |
| 2021/0231915 | A1* | 7/2021 | Barros | A45C 13/002 |
| 2023/0037461 | A1* | 2/2023 | Salemnia | H04N 23/57 |

* cited by examiner

Primary Examiner — Amy R Hsu
(74) Attorney, Agent, or Firm — Knobbe, Martens, Olson & Bear, LLP (57) ABSTRACT

In one aspect, a portable media capture device comprises an image sensor and a support portion configured to receive a mobile device. In use, the support portion supports the image sensor (which is external to the mobile device) in a front-facing configuration relative to the mobile device, in which a user region forward of a display screen of the mobile device falls within a field of view of the image sensor. The portable media capture device additionally comprises a host computer configured to pair with the mobile device, enabling the host computer to receive messages from the mobile device indicating changes in display state at the mobile device, and to thereby synchronize its external video capture function with changes in the display state of the mobile device.

20 Claims, 6 Drawing Sheets

PORTABLE MEDIA CAPTURE DEVICE

TECHNICAL FIELD

The present disclosure pertains to a portable media capture device, and to computer programs and methods to support operation of the same.

BACKGROUND

An increasing emphasis is being placed on 'authentic' video content. Often, such content is captured using camera-equipped mobile devices, such as smartphones. As smartphone cameras are becoming increasingly sophisticated, content of this nature is increasingly rivalling or even surpassing more traditional television or movie content in popularity. A typical modern smartphone is equipped with both a rear-facing and a front-facing camera, which is typically of lower quality than the rear-facing camera.

SUMMARY

According to a first aspect herein, a portable media capture device comprises an image sensor and a support portion configured to receive a mobile device. In use, the support portion supports the image sensor (which is external to the mobile device) in a front-facing configuration relative to the mobile device, in which a user region forward of a display screen of the mobile device falls within a field of view of the image sensor (in the case of a modern smartphone, this 'external' sensor would typically have a field of view that fully or partially overlaps with the field of view of the mobile device's own front-facing camera). The portable media capture device additionally comprises a host computer configured to pair with the mobile device, enabling the host computer to receive messages from the mobile device indicating changes in display state at the mobile device, and to thereby synchronize its external video capture function with changes in the display state of the mobile device.

BRIEF DESCRIPTION OF FIGURES

Illustrative embodiments will now be described, by way of example only, with reference to the following schematic figures, in which.

DETAILED DESCRIPTION

Despite their increasing sophistication, smartphones are restricted in their hardware and software capabilities. An aim herein is to enable 'continuous' video image capture of a mobile device user whenever the mobile device is in use. However, the limitations of mobile devices present various challenges in this context.

An important consideration is power consumption. High-quality video capture consumes significant power, and can rapidly deplete a portable power source, such as a battery or batteries, particularly if the mobile device's software and/or hardware is not optimized for this purpose. Software limitations of mobile devices are also an important challenge, particularly in mobile devices with 'closed' operations systems which impose stringent software limitations by design.

Herein, a portable media capture device provides an external video capture function, for use in conjunction with a mobile device. The portable image capture device operates as a host machine, and it is equipped with its own video capture hardware (which is 'external' hardware from the perspective of the mobile device, separate and independent of any camera hardware of the mobile device itself). The portable media capture device pairs with the mobile device, and synchronizes its external video capture function with changes in a display state of the mobile device. This synchronization functionality avoids extended intervals of video capture when the mobile device is not in use, and can, moreover, be implemented using lightweight (e.g. 'headless') software running on the host computer that consumes relatively minimal power. The host computer can be optimized for this purpose, both in its hardware (e.g. using minimal hardware components) and software (application/operating system) architecture.

Most modern user devices, such as smartphones are equipped with a display screen and a 'front-facing' camera. One approach would be to run software on the mobile device which causes the mobile device's front-facing camera to continuously capture video. However, this would place a significant drain on the mobile device's battery, causing rapid depletion of the battery. Another approach would be to try to mitigate this with monitoring software on the mobile device that detects when the mobile device in in use, and activates the front-facing camera only when use of the mobile device is detected. However, the monitoring software would also have to run continuously, and on typical mobile operating systems, it would be challenging if not impossible to run such monitoring software in an efficient way, meaning the monitoring software itself would also likely be a significant drain on the mobile device's battery. Moreover, on certain 'closed' mobile OSs, it is not even possible to install such software (without resorting to 'jailbreaking' which may be undesirable from a performance and/or security perspective).

With the above consideration in mind, a different approach is taken herein. In the described embodiments, a portable media capture device is provided, which can be physically coupled to a mobile device. The portable media capture device is equipped with its own front-facing image sensor (camera), processor and software (application/operating system) stack, separate from those of the mobile device. The front-facing camera of the portable media capture device is referred to as an "external camera" below, being external to the mobile device.

If the portable media capture device were configured to capture video at all times (including times when the mobile device is not in use), this would also have a high cost in unnecessary power consumption. Therefore, the portable media capture device is programmed to detect when the mobile device it is coupled to is in use. Whilst this does require continuous monitoring, the portable media capture device need only implement a limited set of functions compared with the mobile device. Therefore, the hardware and/or software of the portable media capture device can be much more readily architected for power efficiency. For example, a light-weight Linux-based OS can be installed on the portable media capture device, capable of running in a low-power "headless" mode (without any display or graphical user interface, and without any traditional user input devices such as a mouse and keyboard).

A challenge in this context is detecting when the mobile device is in use, in a robust and a power efficient manner Potentially, a lower-power sensor (or sensors) could be used to try to detect user presence. However, that would still require significant power to process the sensor data, and in any event such sensors are not necessarily reliable, meaning there is a risk that video is not captured during periods of device usage.

An approach is described below, which instead establishes a pairing connection with the mobile device and utilizes messages received from the paired mobile device. For example, certain mobile devices are able to establish a 'trusted' pairing connection with an external 'host' machine, and can be configured to share information about their state in real-s time via messages sent to the trusted host. The examples below utilize messages communicating changes in display state relating to the mobile device's display screen (or from which changes in display state may be inferred). This enables the host computer to synchronize activation/deactivation of the external camera with changes in the display state of the mobile device. In the examples below, the camera is activated responsive to the display screen entering an active state, and deactivated responsive to the display screen entering an inactive state. Note, 'inactive' in this context includes not only an 'off' state, but also, for example, a low power mode of a mobile device with an 'always-on display', in which limited information is displayed. In other embodiments, other display state changes can be used for synchronization (such as transitions to/from a lock screen).

As well as being robust and power efficient, this approach also has the benefit of being able to reliably capture 'reaction' shots to notifications (such as messages, app notifications etc.) displayed at the mobile device. A visual notification will cause a change in display state (for example, activating a display backlight, or switching from a lower power 'always on' screen state to a fully active state), and the external camera can be activated in response. When a user then goes to view the notification, their visual reaction to the notification is guaranteed to be recorded.

The external image sensor can also be tailored to a desired media capture context. For example, to capture professional-grade video data of a quality suitable for television or movies, a high-resolution (e.g. HD, 4K, 8K etc.) landscape-oriented image sensor may be chosen, e.g. at a frame rate of 30 Hz or 60 Hz. The mobile device's built-in front-facing camera would typically be portrait oriented, and may not have sufficient image quality. One use case is incorporating 'authentic' content of this nature within more traditional media formats, such as television. In this context, there may be specific technical requirements, such as the need for landscape-oriented, high-quality video.

An additional challenge arises with 'closed' mobile operating systems, such as iOS®, which use non-standard protocols, such as the "usbmux system", which is a closed, TCP-like system used to facilitate communication between an application on a host machine and an iOS® device. These specific challenges are addressed below.

Note, however, that the present subject matter is not limited in its application of iOS® devices, and can be implemented with other forms of mobile device, such as Android® devices. Similar principles to those described below can be applied to other forms of mobile device. Android® is generally more flexible and 'open' than iOS®, and would not necessarily present the same level of challenge.

Figure 1A:
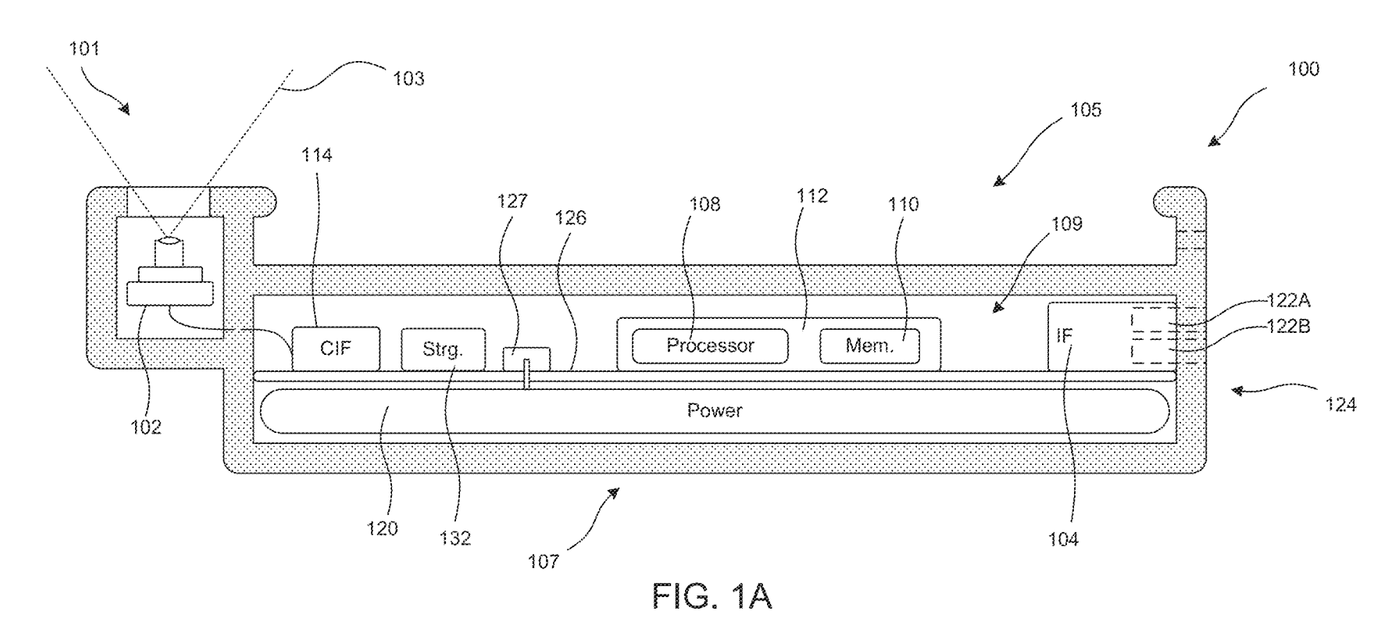
FIG. 1A shows a cross-sectional side view of a portable media capture device.

FIG. 1A shows a highly schematic cross-sectional side view of a portable media capture device 100 in one example embodiment.

The portable media capture device 100 is shown to comprise a camera portion 101, a support portion 105, and a body portion 107. The camera portion 101, support portion 105 and body portion 107 are connected to each other and formed by a casing of the portable media capture device 100 in this example.

The portable media capture device 100 is shown to comprise an image sensor 102, housed within the camera portion 101, which in turn is located at an upper end of the portable media capture device 100. The image sensor 102 has a field of view 103 directed towards an expected user region for capturing images of a user when the portable image capture device 100 is in use.

The body portion 107 houses various internal electronics. The portable media capture device 100 is shown to comprise, housed within the body portion 107, an internal power source 120, such as a battery or set of batteries (which may be removeable or integrated in the portable device 100) and a host computer 109, which in turn is shown to comprise a processor 108 (such as a central processing unit (CPU) or set of multiple CPU cores), a processor memory 110 coupled to the processor 108, a camera interface (CIF) 114 (such as a camera serial interface or USB interface), and a data interface 104. The processor 108 and the processor memory 110 are integrated in a system on chip (SoC) 112 in this example. A printed circuit board (PCB) 126 is housed within the body portion 107, and the SoC 112, the CIF 114 and the data interface 104 are coupled to and supported by the PCB 126. The data interface 104 and the CIF 114 are connected to the SoC 112 via connections within the PCB. The image sensor 102 is connected to the CIF 114 via a wired connection in this example. A power connector 127 connects the internal power source 120 to the PCB 126 to provide electrical power to the SoC 112, the image sensor 102 and the data interface 104. In this example, the image sensor 102 and CIF 114 are internal to the portable image capture device 100. In other embodiments, the image sensor 102 may, for example, be a detachable component, which connects to the host computer 109 via an externally-exposed camera interface.

The processor memory 110 is configured to store code (computer-readable instructions) for execution on the processor 108, which cause the processor to carry out the instructions described below. Additional memory is shown, in the form of a persistent storage device 132 that is housed within the body portion 107 in this example. The persistent storage device may, for example, take the form of a secure digital (SD) card, miniature solid-state hard drive, flash memory storage chip or other solid-state memory device etc. The SoC 112 is configured to load code portions stored on the persistent storage device 132 into the processor memory 110 for execution on the processor 108. A lightweight OS (e.g. Linux®-based) may be stored on the code storage device 132, and the SoC 112 may be configured to boot from the code storage device 132. Alternatively or additionally, code may be stored on an external storage device connected via one of the data ports 122A-C, for example.

The host computer 109 can, for example, be implemented using off-the-shelf hardware, including but not limited to commercially available single-board computers (SBCs).

The data interface 104 is located at a lower end 124 of the device 100 in this example, opposite the camera portion 101.

The support portion 105 is configured to receive a mobile device and support the camera portion 101 of the portable media capture device 100 in a front-facing configuration relative to the mobile device. No mobile device is shown in FIGS. 1A-B, but a mobile device 200 is shown in FIGS. 2A-C.

Figure 1B:
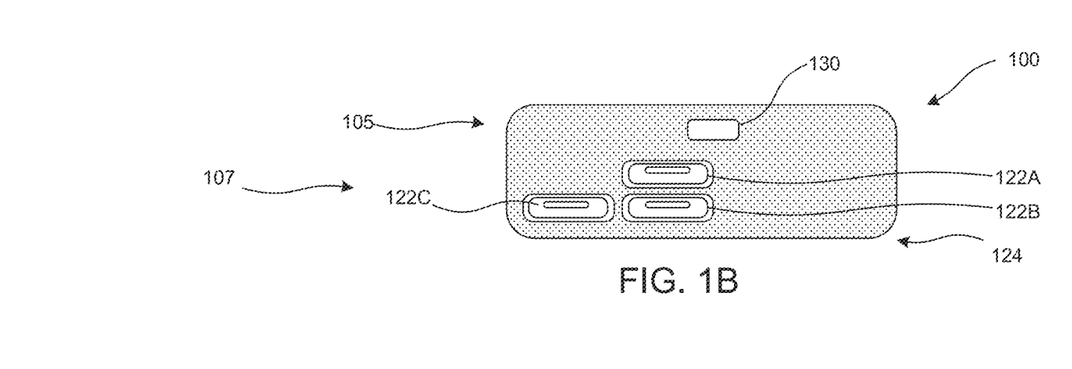
FIG. 1B shows an end view of a portable media capture device.

FIG. 1B shows a schematic view of the lower end 124 of the portable media capture device 100. In this example, the data interface 104 comprises first, second and third data ports 122A, 122B, 122C, which are accessible via respective openings in the body portion 107. For example the data interface 104 may be a universal serial bus (USB) interface, comprising multiple USB ports. An additional opening 130 is shown in the support portion 105, located to provide access to a power/data port of the mobile device in use.

Returning to FIG. 1A, the first and second ports 122A, 122B are also shown in the side view of FIG. 1A.

Figure 2A:
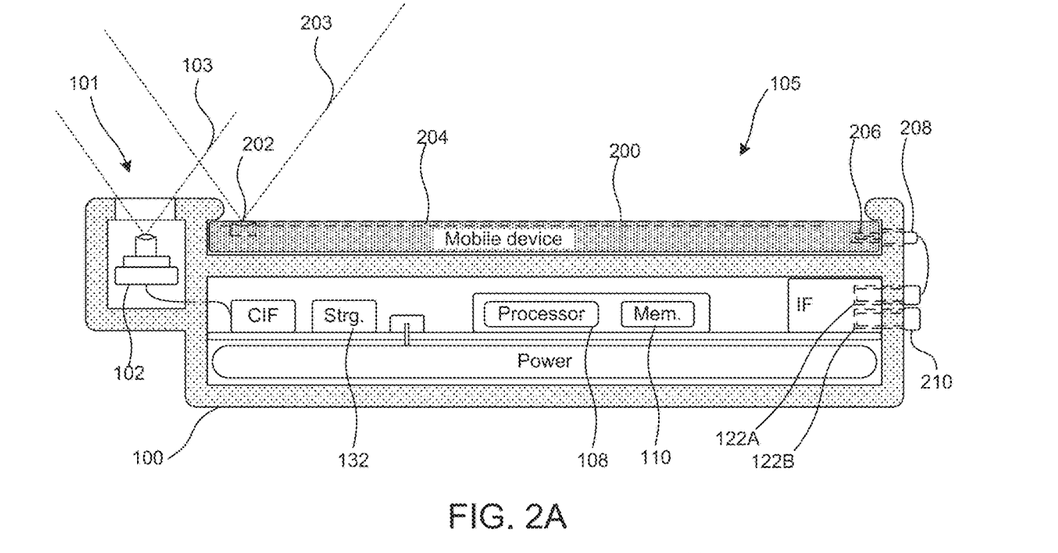
FIG. 2A shows a cross-sectional side view of a portable media capture device supporting a mobile device.
Figures 2B, 2C:
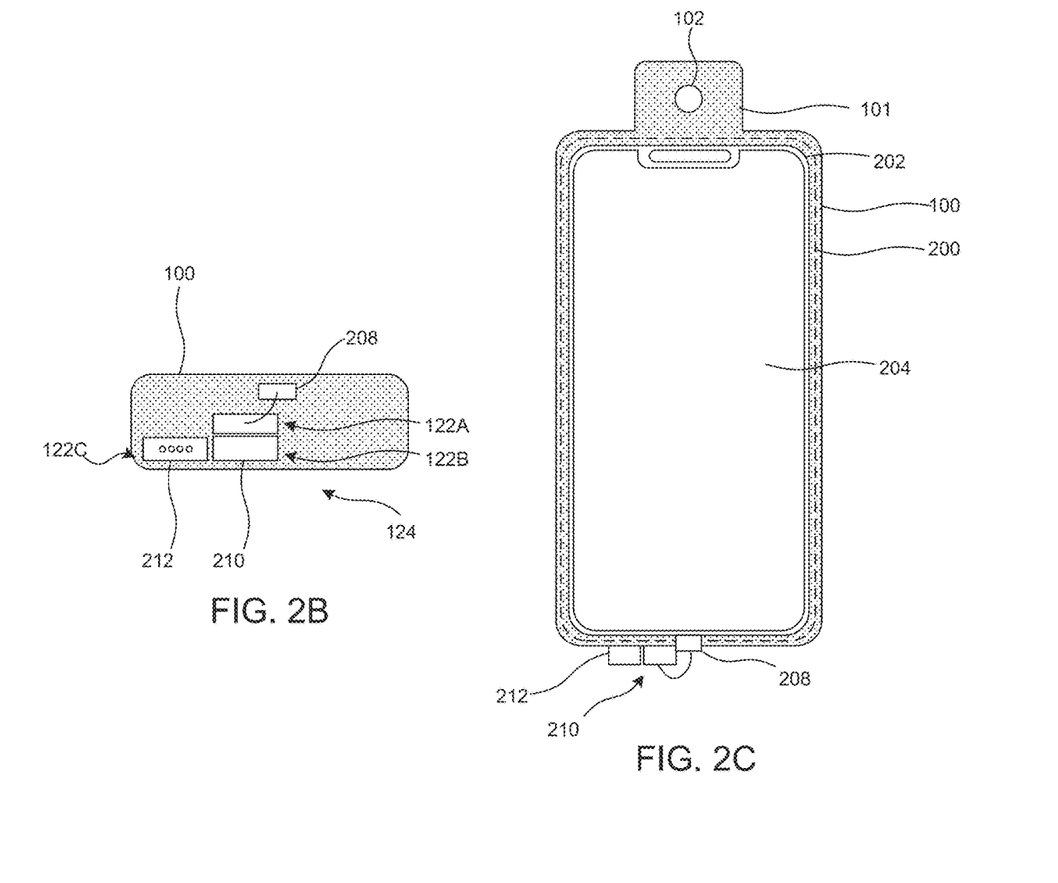
FIG. 2B shows an end view of a portable media capture device supporting a mobile device.
FIG. 2C shows a front view of a portable media capture device supporting a mobile device.

FIG. 2A shows a cross-sectional side view of the portable media capture device 100, coupled to a mobile device 200.

In this example, the support portion 105 forms a channel shaped to receive and encase (substantially surround the perimeter of) the mobile device 200, thereby supporting the mobile device 200 with the camera portion 101 in a front-facing configuration, such that the field of view 103 of the image sensor 102 is directed towards the user region for capturing an image of a user when the device 100 is in use.

The support portion 105 may be configured to attach to the portable media capture device 200 to the mobile device 200. For example, the support portion 105 may be shaped to provide a friction fit with the mobile device 200, or a removable lip or front panel may be provided on the front of the portable media capture device 100 hold the mobile device 200 in place. In some such embodiments, the portable media capture device 100 may also function as an external protective case for the mobile device, with the support portion 105 forming a case portion that encases the mobile device 200.

In other embodiments, the support portion may take different forms, such as clip, magnetic fastener or other coupling system that releasably couples the portable media capture device 100 to the mobile device 200 in a manner that supports the camera portion 101 in a front-facing configuration.

The support portion 105 is configured to support the mobile device 200 with a display screen 204 of the mobile device 200 facing outwardly towards a user region. The mobile device 200 is equipped with its own image sensor 202 having a field of view 203 that overlaps, at least to some extent, with the field of view 103 of the portable media capture device 100.

An external port 206 of the mobile device 200 is shown connected to the first data port 122A via a wired connector 208, which connects the mobile device 200 to the host computer 109 of the portable media capture system 100, enabling messages to be exchanged between the devices 100, 200. An external storage device 210, in the form of a miniature USB 'thumb drive' is shown connected to the second data port 122B, enabling the processor 108 to store (among other things) video data captured by the image sensor 102 in the external storage device 210. The host computer 109 and external storage service 210 may be configured to support "hot-swap" functionality, enabling the external device to simply be removed and replaced at any time, without disrupting the operation of the host computer 109. Alternatively, captured media data may be stored in an internal storage device, such as a flash memory chip mounted on the PCB 126.

FIG. 2B shows schematic view of the lower end 124 of portable media capture device 100, in which the wired connector 208 and the external storage device 210 are visible. An audio sensor 212 is shown connected to the third data port 122C. The audio sensor 212 comprises at least one microphone, via which the processor 108 can capture audio data in the vicinity of the mobile device 200. Captured audio data is stored in the external storage device 210, along with the captured video data. Alternatively, an audio sensor may be integrated in the host computer 109 itself, e.g. with a suitable opening in the casing to allow audio signals to pass.

In this example, the wired connector 208 is external to the portable media capture 100. In another embodiment, the wired connector 208 is housed within the portable media capture device 100. In yet another embodiment, the portable media capture device 100 may instead comprise a wireless interface (e.g. Bluetooth®), which provides a wireless data connection to the mobile device 200. Whilst in the present example, the data ports 122A-C have the form of separate physical ports, in other implementations they may be separate logical ports, e.g. to provide multiplexing over a single physical data interface, such as a wireless interface.

In some contexts, a wired connection (e.g. USB) to a local storage device 210 may be preferred, as this is generally more power efficient. Nevertheless, with a wireless interface (e.g. Bluetooth, Wi-Fi etc.), captured media could instead be outputted to an external storage location, such as a 'cloud' storage location or local network storage location.

FIG. 2C shows a front-facing view (from the user's perspective) of the portable media capture device 100 supporting the mobile device 200. The camera portion 101 can be seen located above the display screen 204 of the mobile device 200, with the display screen 204 and the image sensor 102 facing the user.

Figure 3:
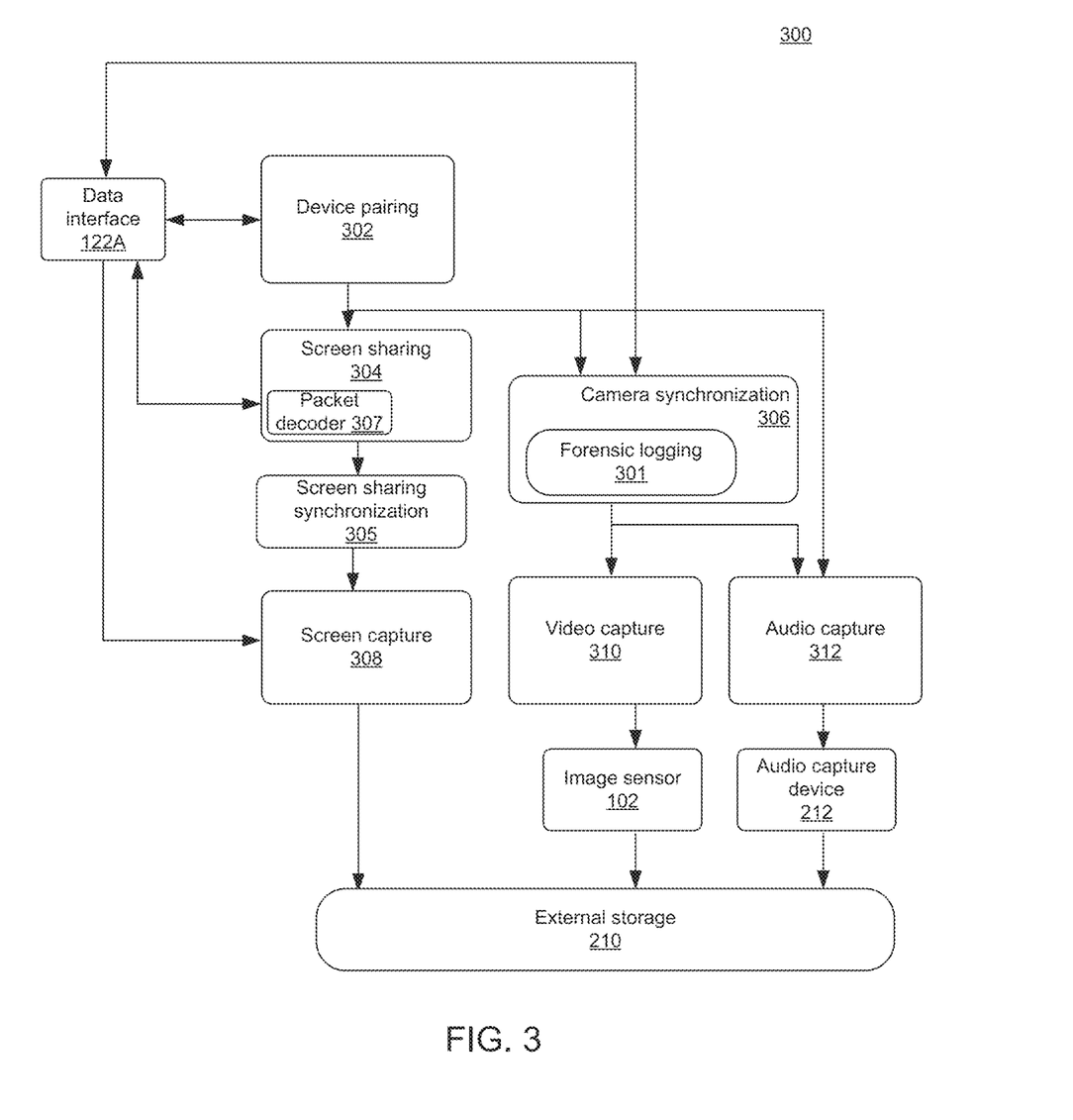
FIG. 3 shows a function block diagram of a media capture system implemented in software.

FIG. 3 shows a highly schematic block diagram of a media capture system 300, representing functionality implemented on the processor 108 of the portable media capture device 100.

A device pairing component 302 monitors the first data port 122A, detects when the mobile device 200 is connected to the first data connection 122A, and establishes a trusted pairing connection with the mobile device 200. In some mobile devices, this may require authorization from a user at the mobile device 200 (e.g. with the user entering a code, or though biometric recognition).

Upon connecting to the mobile device 200, a screen sharing component 304 instigates a screen sharing session with the mobile device 200, which causes the mobile device to enter a screen sharing state. When operating in the screen sharing state, the mobile device streams a screen sharing video image mirroring content displayed on its display screen 204 when the display screen 204 is active. The screen capture video image is streamed via the first data port 122A. Certain devices will continuously output screen sharing video, even when the display 204 is inactive (indicating the phone is not in use). In the present example, this data is only recorded to a file in the external storage 210 when the display 204 is determined to be active, and the screen sharing video data received from the mobile device 200 at other times is discarded.

Connection to the mobile device 200 also causes a camera synchronization component 306 to begin monitoring the display state of the mobile device's display screen 204. Information about the mobile device's display via the pairing connection in various ways.

A screen capture component 308 causes the screen capture video image to be stored to the external storage 210 during intervals in which the mobile device's display screen display screen 204 is active. During substantially the same periods, a video capture component 310 activates the image sensor 102, causing the image sensor to capture a camera video image, and stored the camera video image in the external storage 210. When the mobile device's display screen 204 is deactivated, the image sensor 102 is deactivated, and the recording of the screen share video image is terminated.

In this example, different mechanisms are used to trigger camera activation and recording of screen share video, for the reasons explained below. Hence, a separate screen sharing synchronization component 305 is shown connected to the screen sharing capture component 308.

With an iOS® mobile device in particular, obtaining real-time screen-state information in the host computer 109 is not necessarily straightforward. One insight herein is the use of a forensics mode in this context. FIG. 3 shows the camera synchronization component 306 to comprise a forensic logging component 301, which communicates with the mobile device 200 via the trusted pairing connection to cause the mobile device 200 to enter a forensics mode.

By placing an iOS device into forensics mode, once a trusted connection has been established, it is possible to obtain system logs (syslogs) from the iOS device in real-time. One example of a library that may be used for this purpose is the "libimobiledevice' library available https://github.com/libimobiledevice/libimobiledevice, incorporated herein by reference in its entirety, which provides an idevicesyslog utility that can be used for this purpose.

By placing the mobile device 200 into forensics mode, it is possible to obtain a real-time sequence of forensics logs, which the camera synchronization component 306 analyses to detect changes in the mobile device's display state. Display changes detected though log analysis, in turn, trigger activation/deactivation of the image sensor 102.

In some embodiments, the analysis of system logs may be used to trigger/end the recording of screen capture video data to the external storage 210. However, this has the potential to introduce delay in the software stack. Moreover, in practice, screen capture functions and forensic logging functions may be implemented using separate libraries on the host computer 109, in which case some form of application programming interface (API) would be needed to enable communication between those libraries.

Therefore, in the example of FIG. 3, the screen sharing synchronization component 305 instead detects changes in the mobile device's delay state by analysing the stream of screen sharing packets received from the mobile device 200 in real-time. This approach reduces latency of the screen sharing synchronization (reducing the risk that screen capture video is wrongly discarded when the mobile device's display 204 is active), and simplifies the software architecture of the host machine 109.

In other embodiments, the same synchronization mechanism may be used to trigger activation/deactivation of the image sensor 102 and to initiate/terminate the recording of screen sharing video data (e.g. both could be triggered based on system log analysis, or both could be triggered via analysis of screen sharing packets)

In this example, an audio capture component 312 causes the audio sensor 212 to begin capturing audio data as soon as the mobile device 200 is connected. Captured audio data is also stored to the external storage 210, and audio capture continues until the mobile device 200 is disconnected. Hence, the capturing of audio is not dependent on the display state of the mobile device's display screen 204. However, the audio capture component timestamps the captured audio data based on the display state to enable synchronization with the recorded camera and screen sharing video.

In other embodiments, audio capture may also be synchronized to changes in the display state of the mobile device 200, in the same way as camera and screen sharing video. For example, audio, camera video and screen sharing video may only be captured when the display screen 204 is determined to be in an active state. Either synchronization mechanism may be used for this purpose.

For example, the audio data may be separated in the external storage 210 into timestamped audio files (e.g. with timestamps in the file names) corresponding to intervals in which the display 204 is activated and intervals in which the display is deactivated. The camera and screen sharing images may be separated into timestamped video files (e.g. (e.g. with timestamps in the file names) corresponding to the intervals in which the mobile device's display screen 204 is active. Hence, for each interval in which the display 204 was active, there will be three files with matching timestamps: and audio file, a camera video file, and a screen sharing video file. For each interval in which the display 204 was inactive, there will be only an audio file, which is not associated with any video file.

Figure 4:
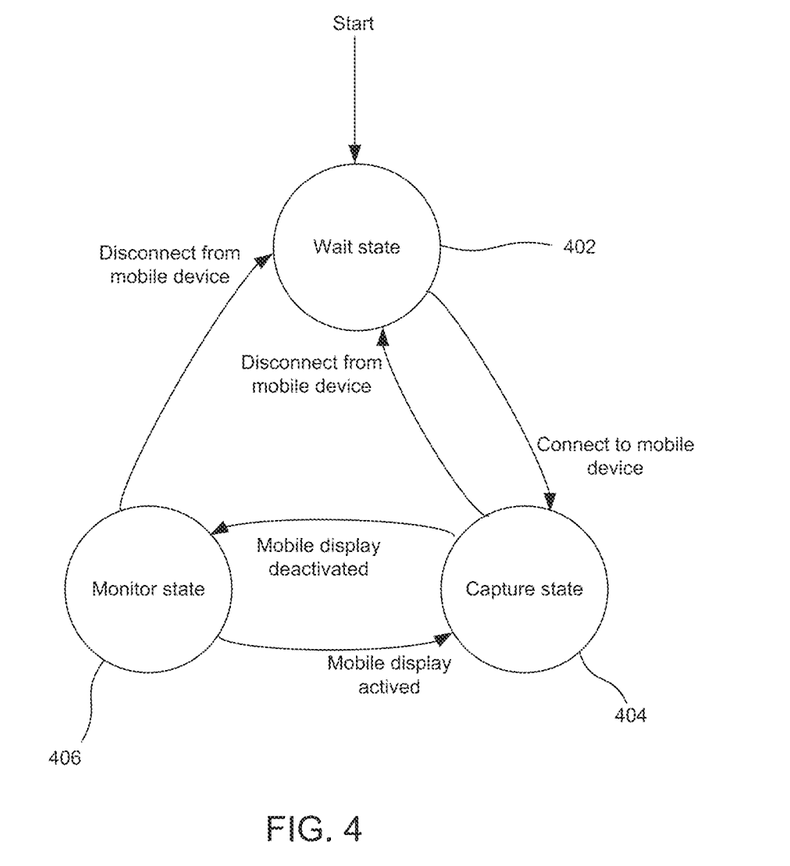
FIG. 4 shows a state machine for a media capture system.

FIG. 4 shows a highly schematic state machine denoting state changes in the media capture system 300 of the portable media capture device 100.

On boot up, the portable media capture device 100 is initially in a wait state 402, waiting for a mobile device to be connected.

When a mobile device 200 is detected, and a paring connection with the mobile device 200 is established, the device 100 typically enters a (full) capture state 404, in which camera and screen sharing video are captured, together with audio, as the mobile device display will typically be active at that point.

When the mobile device display 204 is deactivated, the portable media capture device 100 transitions to a monitor state 406, in which only audio is captured. The portable media capture device 100 continues to monitor the mobile device 200, awaiting any change in its display state.

Whilst the mobile device is connected, the portable media capture device 100 can transition back and forth between the capture state 404 and the monitor state 406, synchronously with changes in the mobile device's display state.

Upon termination of the pairing connection (e.g., caused by disconnection of the mobile device 200), the portable media capture device 100 re-enters the wait state 402.

Figure 5:
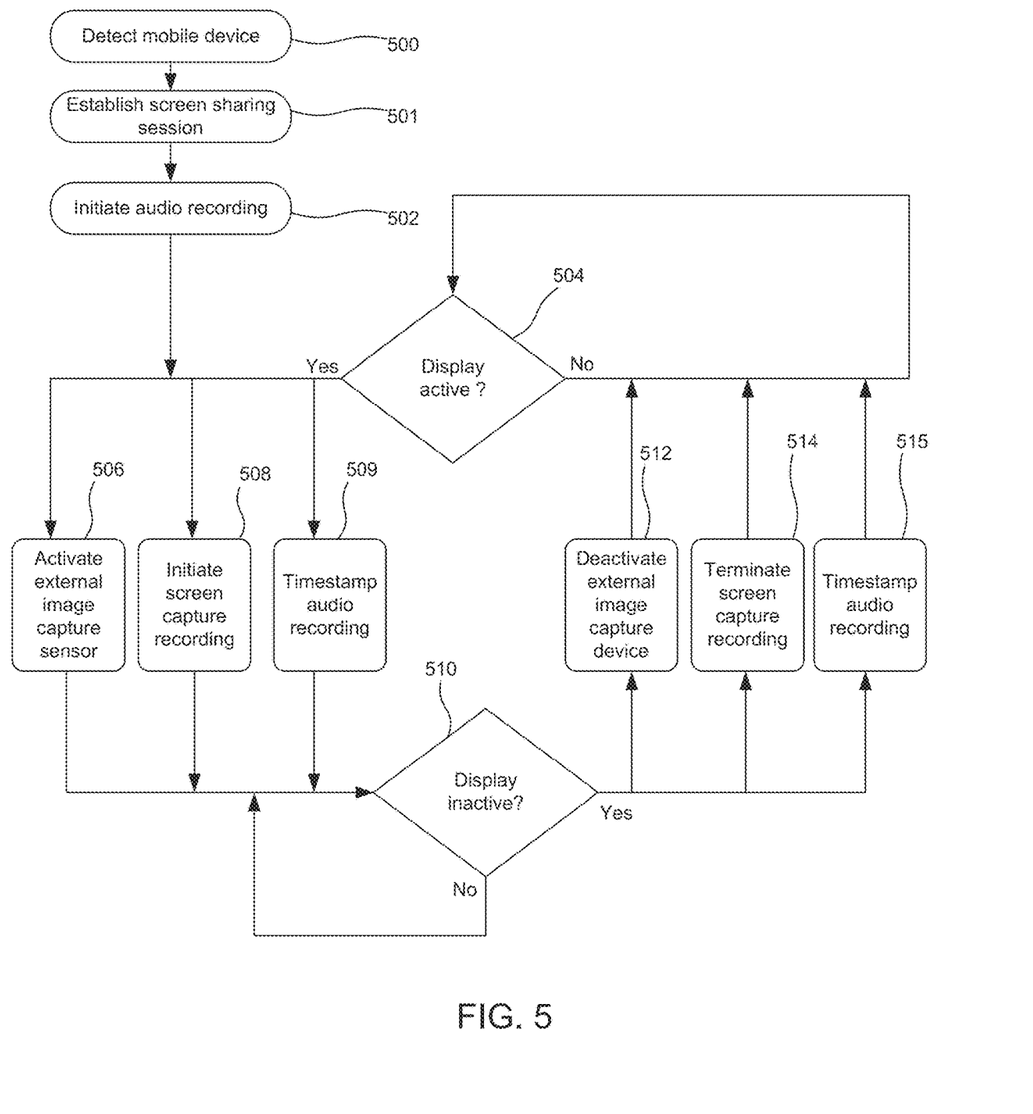
FIG. 5 shows a flow chart for a method of synchronized media capture and recordal.

FIG. 5 shows a flowchart for a method of synchronized media capture and recordal implemented in the media capture system 300 of the portable media capture device 100.

At step 500, the device pairing component 302 detects the presence of the mobile device 200 at the first data port 122A, and establishes a pairing connection between the mobile device 200 and the host computer 109 of the portable media capture device 100.

To achieve communication between an iOS® device and the host computer, one possibility is to use the "usbmuxd" library available at https://github.com/libimobiledevice/usbmuxd, incorporated herein by reference in its entirety. Usbmuxd provides a Linux-compatible socket-based interface designed to be compatible with iOS devices. In such embodiments, the device pairing component 302 creates a listening socket and listens for a USB mobile device connection. When a mobile device is detected at the listening socket, the device pairing component 302 establishes a connection with the mobile device. This is a two-stage process, in which a basic data connection is first established, and then used to creates a 'trusted' connection (which needs to be confirmed manually at the mobile device 200, unless the host computer 109 is already identified as a trusted devices at the mobile device 200).

In response to step 500, at step 501, the screen sharing component 304 establishes a screen sharing session with the mobile device 200. Once established, the mobile device 200 begins streaming screen capture video data via the pairing connection.

With an iOS® device, native screen sharing functionality is provided in the MacOS® desktop operating system. However, the 'quicktime_video_hack' library available at https://gitgub.com/danielpaulusquicktime_video_hack, incorporated herein by reference in its entirety, can be used to establish a screen sharing connection on other operating systems, such as Linux® and decode packets received from the mobile device 200 in the screen sharing session. FIG. 3 shows a packet decoder 307 within the screen sharing component 304, which decodes screensharing packets received from the mobile device 200.

Step 500 additionally triggers step 502, in which capture and storage of a stream of audio data via the audio sensor 212 is initiated.

Although shown sequentially, steps 501 and 502 can be performed in either order or in parallel.

Assuming the mobile device's display is initially active, the method proceeds as follows (if the mobile device's display screen 204 is not active initially, the method instead proceeds, at this point, to step 504, which is described below). The image sensor 102 is activated (step 506), commencing the capturing and storing camera video data; simultaneously, the portable media capture device 100 begins storing (Step 508) screen capture video data received from the mobile device 200; the audio data is also time-stamped (step 509).

At step 510, it is determined whether the mobile device's display screen 204 is inactive. Step 510 is an ongoing monitoring process based on messages indicating changes in display state that are received from the mobile device 200 via the pairing connection established at step 500. In the current example, this ongoing monitoring process involves parallel monitoring operations by the camera synchronization component 306 and the screen sharing synchronization component 305, based on different types of messages received from the mobile device 200.

In response to the display screen 204 becoming inactive, three further actions are triggered: the image sensor 102 is deactivated (step 512); the recording of screen capture video data is terminated (step 514), and the audio is timestamped again (step 515). As noted, in the example of FIG. 3, step 512 is triggered by inferring a change in display state from a system log received from the mobile device 200, whilst step 514 is triggered by inferring a change in display state via analysis of the decoded screen sharing packets. The time stamping of the audio data at step 515 can be triggered by either mechanism (as audio is recorded whenever the mobile device 200 is connected, there is no risk that audio data is lost through synchronization latency).

The method then proceeds to step 504, at which it is determined whether the mobile device's display screen 204 is currently active. Step 504 is an ongoing monitoring operation performed whilst the mobile device. Activation of the display screen 204 triggers three actions: the image sensor 102 is activated (step 506) resuming the capturing and storing camera video data (triggered by system log analysis); substantially simultaneously, the portable media capture device 100 resumes storing (step 508) screen capture video data received from the mobile device 200 (triggered by screen sharing packet analysis); the audio data is time-stamped again (step 509).

The mobile device's display screen 204 may, for example, be manually activated by a user, causing the portable media capture device 100 to being capturing both camera video (of the user interacting with their mobile device 200) and screen sharing video (of the corresponding actions on the display screen 204). As another example, the display screen 204 may be activated in response to a notification displayed at the mobile device 200 (e.g. an incoming message or call notification, or some other notification generated on the mobile device 200, such as a news alert). In this case, camera video and screen sharing video are activated at the portable image capture device 100 in response to the notification. If the user then goes to check the notification on their mobile device 200, their immediate reaction to the notification will be captured (in the camera video), together with the notification itself (in the screen sharing video).

The method continues in the same manner until the mobile device 200 is disconnected or the portable media capture device 100 is powered down.

During the screen sharing session, the mobile device may additionally share its local audio, which can also be recorded if desired. Some mobile devices will mute their own loudspeaker(s) when the screen sharing session is active. Thus, in some embodiments, the media capture device 100 may additionally include a loudspeaker, via which audio received from the mobile device 200 is outputted to the user.

Figure 6:
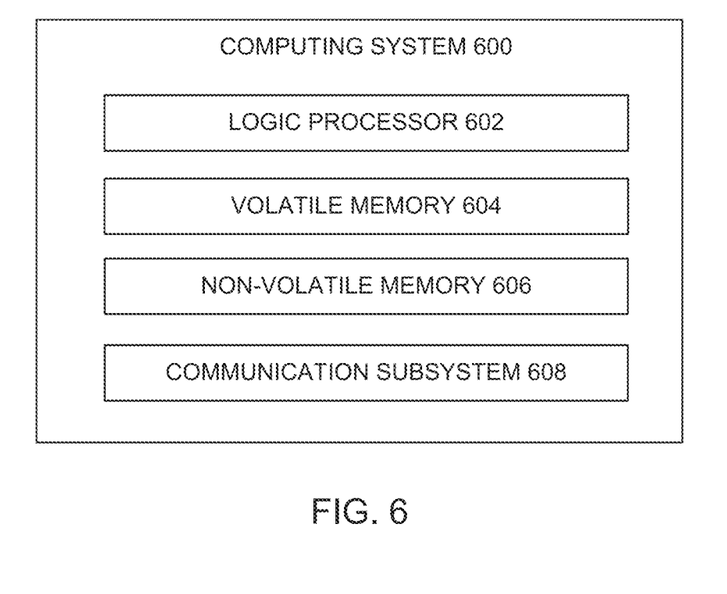
FIG. 6 shows a block diagram of an example computer device.

FIG. 6 shows a highly schematic block diagram of a computer device 600, such as the host computer 109. Computer device 600 includes a logic processor 602 (such as the processor 108), volatile memory 604 (such as the processor memory 110), and non-volatile memory 606 (such as the storage devices 210, 132). Logic processor 602 comprises one or more physical (hardware) processors configured to carry out processing operations. For example, the logic processor 602 may be configured to execute instructions that are part of one or more applications, programs, routines, libraries, objects, components, data structures, or other logical constructs. In the above examples, the processor 602 executes a lightweight, headless Linux-based operating system, on which streamlined application code runs to carry out the described functions in a resource and power-efficient manner, with additional libraries, e.g., to support screen sharing, forensic logging and usbmuxd communication with iOS® devices.

The logic processor 602 may include one or more hardware processors configured to execute software instructions based on an instruction set architecture, such as a central processing unit (CPU), graphical processing unit (GPU) or other form of accelerator processor. Additionally, or alternatively, the logic processor 602 may include a hardware processor(s)) in the form of a logic circuit or firmware device configured to execute hardware-implemented logic (programmable or non-programmable) or firmware instructions. Processor(s) of the logic processor 602 may be single-core or multi-core, and the instructions executed thereon may be configured for sequential and/or parallel processing. Non-volatile memory 606 includes one or more physical devices configured to hold instructions executable by the logic processor 606 to implement the methods and processes described herein. When such methods and processes are implemented, the state of non-volatile memory 606 may be transformed—e.g., to hold different data. Non-volatile memory 606 may include physical devices that are removable and/or integrated. Volatile memory 604 may include one or more physical devices that include random access memory. Volatile memory 604 is typically utilized by logic processor 602 to temporarily store information during processing of software instructions. Aspects of logic processor 602, volatile memory 604, and non-volatile memory 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "system", "function", "engine" and "component" may be used to describe an aspect of computing device 600 typically implemented in software by a processor to perform a particular function using portions of volatile memory, which function involves transformative processing that specially configures the processor to perform the function. Thus, a component, program, or engine etc. may be instantiated via logic processor 602 executing instructions held by non-volatile memory 606, using portions of volatile memory 604. Communication subsystem 608 may (e.g., comprising the camera interface 114 and data interface 104) provide communication between the host computer and other internal/external device(s). Communication subsystem 608 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing device 600 to send and/or receive messages to and/or from other devices via a network such as the internet. The term computer readable media as used herein may include computer storage media. Computer storage media may include volatile and non-volatile, removable and nonremovable media (e.g., volatile memory 604 or non-volatile memory 606) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the host computer 109). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

Particular embodiments have been described by way of example only. Other embodiments or variations may be apparent to those skilled in the art. The scope of the present disclosure is not defined by the described examples but only by the accompanying claims.

Features of the disclosure are defined in the statements below.

A first aspect of the present disclosure provides a portable media capture device, comprising: an image sensor; a support portion configured to receive a mobile device, and support the image sensor in a front-facing configuration relative to the mobile device, in which a user region forward of a display screen of the mobile device falls within a field of view of the image sensor; and a host computer configured to pair with the mobile device, the host computer comprising: a data interface configured to establish a pairing connection with the mobile device, a camera interface configured to connect to the image sensor; a memory configured to store computer-readable instructions, and a processor coupled to the memory, the image sensor and the data interface, and configured to execute the computer-readable instructions, which upon execution cause the processor to: cause the image sensor to begin capturing a camera video image responsive to a first message received from the mobile device via the pairing connection indicating a first change in display state of the display screen of the mobile device, and terminate capturing of the camera video image responsive to a second message received from the mobile device via the pairing connection indicating a second change in display state of the display screen of the mobile device.

In embodiments, the computer-readable instructions may be configured to cause the processor to: initiate via the pairing connection a forensic logging mode of the mobile device. The first and second messages may be first and second system logs received from the mobile device operating in the forensic logging mode.

The computer-readable instructions may be configured to cause the processor to: initiate a screen sharing session with the mobile device via the data interface, causing the mobile device to begin outputting a screen capture video image via the data interface.

The computer-readable instructions may be configured to cause the processor to begin recording the screen capture video responsive to the first change in display state and terminate recording of the screen capture video image responsive to the second change in display state.

The computer-readable instructions may be configured to cause the processor to: detect the first and second changes in display state by analysing screen sharing packets received from the mobile device in the screen sharing session.

The computer-readable instructions may be configured to cause the processor to: initiate via the pairing connection a forensic logging mode of the mobile device, wherein the first and second messages may be first and second system logs received from the mobile device operating in the forensic logging mode; wherein the computer-readable instructions may be configured to cause the processor to begin recording the screen capture video responsive to detecting the first change in display state in the screen sharing packets and terminate recording of the screen capture video image responsive to detecting the second change in display state in the screen sharing packets.

The computer-readable instructions may be configured to cause the processor to: responsive to establishing the pairing connection, cause an audio sensor coupled the portable media capture device to begin capturing audio data; generate, responsive to the first change in display state, a first timestamp associated with the audio data, the first timestamp corresponding to a start point of the camera video image; and generate, responsive to the second change in display state, a second timestamp associated with the audio data, the second timestamp corresponding to an end point of the camera video image.

The computer-readable instructions may be configured to cause the processor to store a first portion of the audio data in a first audio file, the first portion of the audio data captured in an interval between the start point and the endpoint of the camera video image, and a second portion of the audio data in a second audio file, the second portion of the audio data captured when the image sensor is inactive.

The portable media capture may comprise: a camera portion housing the image sensor, wherein the support portion comprises a channel shaped to receive and support the mobile device.

The portable media capture may comprise: a portable power source connected to the host computer; a body portion connected to the support portion, the body portion housing the host computer and the portable power source.

The host computer may be configured to operate in a headless mode.

The image sensor may be landscape-oriented.

A second aspect of the present disclosure provides a mobile device case comprising: a case portion shaped to receive and encase a mobile device; a camera portion; an image sensor external to the mobile device, the image sensor housed in the camera portion, the camera portion connected to the case portion so as to support the image sensor in a front-facing configuration relative to the mobile device; a data interface configured to establish a pairing connection with the mobile device; a memory configured to store computer-readable instructions; and a processor coupled to the memory, the image sensor and the data interface, and configured to execute the computer-readable instructions, which upon execution cause the processor to: cause the image sensor to begin capturing a camera video image responsive to a first change in display state communicated by the mobile device via the pairing connection, and terminate capturing of the camera video image responsive to a second change in display state communicated by the mobile device via the pairing connection.

In embodiments, the computer-readable instructions may be configured to cause the processor to: initiate via the pairing connection a forensics mode of the mobile device, the first and second changes in display state detected via analysis of system logs received from the mobile device operating in the forensics mode.

The computer-readable instructions may be configured to cause the processor to: initiate a screen sharing session with the mobile device via the data interface, causing the mobile device to begin outputting a screen capture video image via the data interface.

The computer-readable instructions may be configured to cause the processor to begin recording the screen capture video responsive to the first change in display state and terminate recording of the screen capture video image responsive to the second change in display state.

The image sensor may be landscape-oriented relative to the mobile device.

The mobile device case may comprise an audio sensor coupled to the processor and external to the mobile device, the audio sensor configured to capture audio data.

Further optional features of the second aspect are as defined above in relation to the first aspect and may be combined in any combination.

A third aspect of the present disclosure provides a computer-readable storage medium embodying computer-readable instructions, which upon execution on a processor of a host computer are configured to cause the processor to: establish a pairing connection with a mobile device external to the host computer; cause an image sensor of the host computer to begin capturing a camera video image responsive to a first message received from the mobile device via the pairing connection indicating a first change in display state of the display screen of the mobile device; and terminate capturing of the camera video image responsive to a second message received from the mobile device via the pairing connection indicating a second change in display state of the display screen of the mobile device.

In embodiments, the computer-readable instructions may be configured to cause the processor of the host computer to: initiate via the pairing connection a forensics mode of the mobile device, the first and second changes in display state detected via analysis of system logs received from the mobile device operating in the forensics mode.

The computer-readable instructions may be configured to cause the processor of the host computer to: initiate a screen sharing session with the mobile device via the data interface, causing the mobile device to begin outputting a screen capture video image via the data interface.

Further optional features of the third aspect are as defined above in relation to the first and second aspect and may be combined in any combination.

The invention claimed is:

1. A portable media capture device, comprising:
   an image sensor;
   a support portion configured to receive a mobile device, and support the image sensor in a front-facing configuration relative to the mobile device, in which a user region forward of a display screen of the mobile device falls within a field of view of the image sensor; and
   a host computer configured to pair with the mobile device, the host computer comprising:
      a data interface configured to establish a pairing connection with the mobile device,
      a camera interface configured to connect to the image sensor;
      a memory configured to store computer-readable instructions, and
      a processor coupled to the memory, the image sensor and the data interface, and configured to execute the computer-readable instructions, which upon execution cause the processor to:
         cause the image sensor to begin capturing a camera video image responsive to a first message received from the mobile device via the pairing connection indicating a first change in display state of the display screen of the mobile device, and
         terminate capturing of the camera video image responsive to a second message received from the mobile device via the pairing connection indicating a second change in display state of the display screen of the mobile device.

2. The portable media capture device of claim 1, wherein the computer-readable instructions are configured to cause the processor to:
   initiate via the pairing connection a forensic logging mode of the mobile device, wherein the first and second messages are first and second system logs received from the mobile device operating in the forensic logging mode.

3. The portable media capture device of claim 1, wherein the computer-readable instructions are configured to cause the processor to:
  initiate a screen sharing session with the mobile device via the data interface, causing the mobile device to begin outputting a screen capture video image via the data interface.

4. The portable media capture device of claim 3, wherein the computer-readable instructions are configured to cause the processor to begin recording the screen capture video image responsive to the first change in display state and terminate recording of the screen capture video image responsive to the second change in display state.

5. The portable media capture device according to claim 3, wherein the computer-readable instructions are configured to cause the processor to:
  detect the first and second changes in display state by analysing screen sharing packets received from the mobile device in the screen sharing session.

6. The portable media device of claim 5, wherein the computer-readable instructions are configured to cause the processor to:
  initiate via the pairing connection a forensic logging mode of the mobile device, wherein the first and second messages are first and second system logs received from the mobile device operating in the forensic logging mode;
  wherein the computer-readable instructions are configured to cause the processor to begin recording the screen capture video responsive to detecting the first change in display state in the screen sharing packets and terminate recording of the screen capture video image responsive to detecting the second change in display state in the screen sharing packets.

7. The portable media capture device of claim 1, wherein the computer-readable instructions are configured to cause the processor to:
  responsive to establishing the pairing connection, cause an audio sensor coupled the portable media capture device to begin capturing audio data;
  generate, responsive to the first change in display state, a first timestamp associated with the audio data, the first timestamp corresponding to a start point of the camera video image; and
  generate, responsive to the second change in display state, a second timestamp associated with the audio data, the second timestamp corresponding to an end point of the camera video image.

8. The portable media capture device of claim 7, wherein the computer-readable instructions are configured to cause the processor to store a first portion of the audio data in a first audio file, the first portion of the audio data captured in an interval between the start point and the end point of the camera video image, and a second portion of the audio data in a second audio file, the second portion of the audio data captured when the image sensor is inactive.

9. The portable media capture device of claim 1, comprising:
  a camera portion housing the image sensor, wherein the support portion comprises a channel shaped to receive and support the mobile device.

10. The portable media capture device of claim 1, comprising:
  a portable power source connected to the host computer;
  a body portion connected to the support portion, the body portion housing the host computer and the portable power source.

11. The portable media capture device of claim 1, wherein the host computer is configured to operate in a headless mode.

12. The portable media capture device of claim 1, wherein the image sensor is landscape-oriented.

13. A mobile device case comprising:
  a case portion shaped to receive and encase a mobile device;
  a camera portion;
  an image sensor external to the mobile device, the image sensor housed in the camera portion, the camera portion connected to the case portion so as to support the image sensor in a front-facing configuration relative to the mobile device;
  a data interface configured to establish a pairing connection with the mobile device;
  a memory configured to store computer-readable instructions; and
  a processor coupled to the memory, the image sensor and the data interface, and configured to execute the computer-readable instructions, which upon execution cause the processor to:
  cause the image sensor to begin capturing a camera video image responsive to a first change in display state communicated by the mobile device via the pairing connection, and
  terminate capturing of the camera video image responsive to a second change in display state communicated by the mobile device via the pairing connection.

14. The mobile device case of claim 13, wherein the computer-readable instructions are configured to cause the processor to:
  initiate via the pairing connection a forensics mode of the mobile device, the first and second changes in display state detected via analysis of system logs received from the mobile device operating in the forensics mode.

15. The mobile device case of claim 13, wherein the computer-readable instructions are configured to cause the processor to:
  initiate a screen sharing session with the mobile device via the data interface, causing the mobile device to begin outputting a screen capture video image via the data interface.

16. The mobile device case of claim 15, wherein the computer-readable instructions are configured to cause the processor to begin recording the screen capture video responsive to the first change in display state and terminate recording of the screen capture video image responsive to the second change in display state.

17. The mobile device case of claim 13, wherein the image sensor is landscape-oriented relative to the mobile device.

18. The mobile device case of claim 13, comprising an audio sensor coupled to the processor and external to the mobile device, the audio sensor configured to capture audio data.

19. One or more non-transitory computer-readable storage media embodying computer-readable instructions, which upon execution on one or more processors of a host computing system are configured to cause the one or more processors to:
  establish a pairing connection with a mobile device external to the host computing system;

initiate via the pairing connection a forensics mode of the mobile device;

cause an image sensor of the host computer to begin capturing a camera video image responsive to a first message received from the mobile device via the pairing connection indicating a first change in display state of a display screen of the mobile device; and terminate capturing of the camera video image responsive to a second message received from the mobile device via the pairing connection indicating a second change in display state of the display screen of the mobile device, the first and second changes in display state detected via analysis of system logs received from the mobile device operating in the forensics mode.

20. The one or more non-transitory computer-readable storage media of claim 19, wherein the computer-readable instructions are further configured to cause the one or more processors to:

initiate a screen sharing session with the mobile device via a data interface, causing the mobile device to begin outputting a screen capture video image via the data interface.

* * * * *

Disclaimer

11,856,289 B1 - Richard Bacon, Los Angeles, CA (US); Reed Seerman, Los Angeles, CA (US); Geoffrey Abbott, Los Angeles, CA (US). PORTABLE MEDIA CAPTURE DEVICE. Patent dated December 26, 2023. Disclaimer filed May 28, 2019, by the assignee, DARELTECH LLC ("DARELTECH').

I hereby disclaim the following complete Claims 4, 8, 15, and 21 of said patent.

*(Official Gazette, January 13, 2026)*